United States Patent
McCaul et al.

(12) 
(10) Patent No.: US 8,667,977 B1
(45) Date of Patent: Mar. 11, 2014

(54) OXYGEN SENSOR FOR TANK SAFETY

(75) Inventors: Bruce W. McCaul, Palo Alto, CA (US); Thomas Mac Winsemius, Soquel, CA (US)

(73) Assignee: Oxigraf, Inc., Mountain View, CA (US)

( * ) Notice: Subject to any disclaimer, the term of this patent is extended or adjusted under 35 U.S.C. 154(b) by 215 days.

(21) Appl. No.: 13/412,458

(22) Filed: Mar. 5, 2012

(51) Int. Cl.
| | |
|---|---|
| *F17D 1/00* | (2006.01) |
| *F17D 3/00* | (2006.01) |
| *B67D 7/72* | (2010.01) |
| *B64D 37/04* | (2006.01) |
| *F04F 1/18* | (2006.01) |
| *B65B 31/00* | (2006.01) |

(52) U.S. Cl.
USPC ........... 137/3; 137/209; 244/135 R; 220/88.3; 141/59

(58) Field of Classification Search
USPC ............ 137/487.5, 209, 99, 3, 565.22; 73/23.35–23.42, 19.02, 73/114.38–114.51, 170.02, 170.08, 73/170.09; 244/135 R, 135 B; 220/88.1, 220/88.3; 141/59; 417/160, 185
See application file for complete search history.

(56) References Cited

U.S. PATENT DOCUMENTS

| | | |
|---|---|---|
| 5,047,639 A | 9/1991 | Wong |
| 5,448,071 A | 9/1995 | McCaul et al. |
| 5,491,341 A | 2/1996 | McCaul et al. |
| 5,500,768 A | 3/1996 | Doggett et al. |
| 5,615,052 A | 3/1997 | Doggett |
| 5,625,189 A | 4/1997 | McCaul et al. |
| 6,150,661 A | 11/2000 | McCaul et al. |
| 6,189,516 B1 | 2/2001 | Hei |
| 6,427,543 B1 | 8/2002 | Torrison |
| 6,585,192 B2 * | 7/2003 | Beers .................. 244/135 R |
| 6,634,598 B2 | 10/2003 | Susko |
| 7,013,905 B2 | 3/2006 | Jones et al. |
| 7,352,464 B2 | 4/2008 | Chen et al. |
| 7,481,237 B2 | 1/2009 | Jones et al. |
| 7,574,894 B2 | 8/2009 | Austerlitz et al. |
| 7,625,434 B2 | 12/2009 | Tom et al. |
| 7,896,292 B2 * | 3/2011 | Limaye et al. .......... 244/135 R |
| 8,499,567 B2 * | 8/2013 | Hagh et al. .................. 60/779 |
| 2004/0094201 A1 * | 5/2004 | Verma et al. ............... 137/209 |
| 2008/0128048 A1 * | 6/2008 | Johnson et al. ............. 141/59 |
| 2009/0166358 A1 * | 7/2009 | Bose ....................... 220/88.3 |

FOREIGN PATENT DOCUMENTS

EP       0729565 B1    3/2003

OTHER PUBLICATIONS

Bruce McCaul, Chris Thacker, and Scott Rhodes; "OBIGGS Flight Test Validation"; Sep. 20, 2011; 32 slides; Oxigraf SAE AE-5D Committee.

(Continued)

*Primary Examiner* — Elizabeth Houston
*Assistant Examiner* — Michael R Reid
(74) *Attorney, Agent, or Firm* — Barclay J. Tullis (57) ABSTRACT

Methods and embodiments are described for sampling and measuring oxygen concentrations of flowing samples drawn from the ullage of a chemical or fuel tank and from a source of inerting gas used for purging the tank. The sampled flows are drawn with a venturi pump or a pneumatically driven turbine pump and returned to the ullage of the tank. An optical absorption spectrophotometer is used having a diode laser sensor, and both sensor and the pump can be safely located near to the tank. Control systems and apparatus are disclosed for controlling the oxygen level within the ullage of the tank.

22 Claims, 5 Drawing Sheets

(56) References Cited

OTHER PUBLICATIONS

"Fox Mini-Eductors for Aspirating, Sampling, Mixing, and Vacuum Generation"; http://www.foxvalve.com/It_mini_eductors.aspx [Feb. 27, 2012 8:57:05 PM]; Fox Venturi Eductors / Fox Valve; Dover, NJ 07801.

S.-J. Chen, et al., "Detection of explosive mixtures in the ullage of aircraft fuel tanks," 42nd AIAA Aerospace Sciences Meeting and Exhibit, Reno, Nev., AIAA Paper No. 2004-0548, Jan. 2004).

T. L., Reynolds, et al., "Onboard inert gas generation system/onboard oxygen gas generation system (OBIGGS/OBOGS) study, Part II: Gas separation technology—State of the art," NASA CR-2001-210950, 2001).

* cited by examiner

OXYGEN SENSOR FOR TANK SAFETY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC

Not Applicable

BACKGROUND OF THE INVENTION

1. Field of the Invention

The invention relates to monitoring and controlling the safety of flammables or other hazardous chemicals contained in fuel tanks. One important example is fuel tanks on airplanes. If the ullage (headspace) of a tank is depleted in oxygen, the risk of explosion or reaction is reduced. Inert gas (or an effectively inert gas having a safely low concentration of oxygen) may be used to purge the tank ullage. Measurement of the oxygen concentrations of both the inert gas source and the ullage gas is desirable to assure effective control of an inert gas control system to keep the ullage gas below a safe maximum oxygen concentration. Effective control not only provides for verifying tank safety, but also minimizes fuel penalty and carbon footprint.

2. Description of the Related Art

On-Board Inert Gas Generating Systems (OBIGGS) generally include an oxygen sensor to monitor the Air Separation Module (ASM) output of nitrogen enriched air (NEA) but have not generally monitored the actual oxygen concentration in the ullage of the fuel tanks U.S. Pat. No. 7,625,434 by Tom, Gu, Murphy, and Tang, titled "Enhanced OBIGGS", discloses measurement of oxygen in the output of an ASM and does not identify the type of oxygen sensor to be used. U.S. Pat. No. 7,574,894 by Austerlitz, Hirshman, Bueter, and Wood, titled "ASM Output Ultrasonic Oxygen Sensor", discloses measurement of oxygen content of the output of an ASM by using an ultrasonic sensor.

Oxygen concentrations in tanks have been studied with both in situ and sampling sensors revealing various advantages and disadvantages.

In situ sensors located inside the fuel tank must measure oxygen, endure the environment of the tank, and not increase the risk of explosion. In situ electrochemical oxygen sensors have limited life especially in tank vapors and do not measure well at low temperatures. Zirconia oxygen sensors operating at 700 C are the traditional choice but can provide an ignition source. Fluorescence quenching sensors are temperature sensitive and/or pressure sensitive, and the fluorophores may have limited lifetime and saturation effects. U.S. Pat. No. 6,634,598 by Susko, titled "On-board Fuel Inerting System", discloses a fiberoptic sensor that extends into the tank and which uses chemical fluorescence in combination with a spectrophotometer. Ultrasonic sensors measure the slight difference of the speed of sound in nitrogen and oxygen and are generally less accurate than other sensors types. Each sensor type can have interferences or cross sensitivity with other gases in the tank vapor. In situ sensors having limited lifetime entail difficult service requirements. In the case of in situ optical absorption or fluorescence sensors in tanks, fuel immersion or motion-caused slosh may interfere with the optical sensor window transmission despite metal foam splash guards and droplet removal measures. U.S. Pat. No. 7,352,464 by Chen and Silver, titled "Oxygen Sensor for Aircraft Fuel Inerting Systems", discloses in-situ detection of oxygen in an aircraft fuel inerting system by using an in-tank oxygen sensor having an optical cavity exposed to the ullage gas and vapor.

Sampling sensors make it possible to remove condensate before measurement of the vapor and to control or correct conveniently the pressure and temperature dependencies. However, sampling systems may require float valves in the fuel tank and the sampling line(s) to prevent ingress of fluid from the tank. They may require flow sensors to detect fuel in the sampling line(s) and initiate purging of the line with inert gas if flow is blocked. They may also require use of check valves, control valves, sampling conditioners, filters, and pumps. If condensate is possible, heated lines, condensate traps, or automated line purging are used. For flammable gas mixtures, the risk of explosion in the sensor is mitigated with measures, for example, as heat and spark avoidance, enclosure inerting, and flame arrestors.

In on-board inert gas generating systems (OBIGGS) for aircraft, typically only the output from the air separation module (ASM) is measured, using zirconia or proposed ultrasonic oxygen sensors, but where ullage gas is not measured. Sampling systems have however been used successfully for OBIGGS flight test validation of the actual ullage concentration, but the measurements taken by these sampling systems have not been used to control ullage purging. Experience with fight test oxygen measurement systems reveal further hazards of sampling systems that require other various risk mitigations. The sealed sensor enclosure is provided with inert gas maintained slightly above ambient pressure. The pump motor may be located outside the sensor enclosure, if flammable vapors are not expected there, for example in the pressurized aircraft areas. The high pressure outlet of a sampling pump inside the enclosure presents a hazard in the case of tubing failure that can be mitigated by a pressure-monitored secondary enclosure. These mitigations result in flight test oxygen measurement systems that are massive.

U.S. Pat. Nos. 7,481,237 and 7,013,905 by Jones, O'Hara, and Greenawalt, titled "System and Method for Monitoring the Performance of an Inert Gas Distribution System", disclose the use of a zircon or zirconium (more properly referred to as zirconia or zirconium dioxide) oxygen sensor to measure sample flow from a tank's ullage and control an ASM to provide purging gas to a tank's ullage. Since they teach using an oxygen sensor that must operate at an elevated temperature of approximately 700 degrees Centigrade, they also teach conveying the sample to a "remote" measurement location for safety and to remove hydrocarbons from the sample flow before reaching the measurement location of the oxygen sensor. Jones, et al. teaches discharging the sampled ullage gas overboard.

Routine measurement of ullage oxygen concentrations has not been adopted using either in situ or sampling sensors because of these issues. Among the troublesome hazards of sampling systems are also the possible heat and/or sparking of a pump motor and/or of solenoid valves and the possible leaking at a high-pressure port of the pump into hazardous areas. It would be desirable to sample the tank vapor without an electrically powered pump, eliminating potential ignition sources and reducing the size and weight of the oxygen sensor system. It would also be desirable to enable the use of an oxygen sensor that doesn't require operation with a sensing element at a high temperature, and that doesn't have to be remote from the tank being monitored.

BRIEF SUMMARY OF THE INVENTION

The invention is pointed out with particularity in the appended claims. However, some aspects of the invention are summarized in the following descriptions of some possible implementation examples and aspects.

Embodiments of the present invention employ a portion of output flow from an air-separation-module (ASM), or if necessary from service air, to power a means to draw a sample flow from the ullage of a fuel tank and through an oxygen sensor. Depending upon each particular embodiment of the invention, either a venturi vacuum generator or a pneumatically-driven turbine vacuum generator provides the means to draw the sample flow from the ullage. In this disclosure, this "sample flow from the ullage" is synonymous with "ullage flow", "ullage sample flow", "ullage gas sample flow", or "sample flow of gas and vapor mixture". Also within this disclosure, pneumatically driven pumps will be defined as pumps that derive their primary pumping power from an input port of pressurized fluid (e.g. gas) and do not use an electric motor. And, within this disclosure, "service air" is defined as compressed air made available to some embodiments of the invention but not provided by the elements of those embodiments. The outputs from the ASM or the service air are typically a 276,000 to 414,000 Pa-gauge (40 to 60 psig) compressed gas, but other pressures could conceivably be used instead.

A venturi vacuum generator (also referred to in this disclosure as a "venturi", "venturi device" or "venturi pump") typically has an input port, an exhaust port (also called an "output port"), and a vacuum port (also called a "venturi port"). Within the venturi, a portion of the ASM output of nitrogen-enhanced-air (NEA) is directed from the input port of the venturi through a constricting opening to generate a high velocity stream. This NEA portion expands within the venturi pump, resulting in a decreased pressure to provide vacuum levels to the vacuum port equivalent to low ambient atmosphere pressures found at altitudes of approximately 14,000 meters (approximately 45,000 feet). This vacuum can be used in some embodiments to draw the sample flow from the fuel tank and through the oxygen sensor. The ullage sample flow passes through the oxygen sensor and is then combined within the venturi with the expanded NEA gas and directed out of the venturi output port and returned to the fuel tank. In other embodiments using a venturi, the ullage sample flow does not pass through the oxygen sensor until after it has been combined with the expanded NEA gas and passed out of the venturi output port.

In embodiments that use a pneumatically driven turbine vacuum generator in place of a venturi, the turbine can be two turbine portions on a common spindle or axial, one of the two turbine portions conveying NEA flow or service air from a driving-side or power-side input port to a driving-side or power-side output port, and the other portion conveying the ullage sample from a driven-side input port (also called a vacuum port) to a driven-side output port. Whether a venturi or a turbine is used, the gas flow that is measured is exhausted into the ullage being monitored.

In embodiments that use either a venturi pump or a pneumatically driven turbine pump, the oxygen sensor can be positioned on a vacuum port or either the venturi output port or the driven-side output port of the turbine. In preferred embodiments, the oxygen sensor is a diode-laser absorption spectrophotometer type sensor.

In some embodiments of this invention, a single sensor provides separate measurements of both the NEA output purity and the oxygen concentration in the ullage flow. In the embodiments that connect the oxygen sensor (gas sensor) to the vacuum port of a venturi, an on/off valve controlling the output from the venturi exhaust port can, when shut, cause reverse flow through the venturi port, forcing the NEA that came into the venturi input port to go out of what is otherwise the vacuum port and therefore through the oxygen sensor in the opposite direction with respect to the ullage sample flow. In embodiments that connect the oxygen sensor (gas sensor) to the output port of a venturi, an on/off valve to the vacuum port can shut off flow of ullage gas and thereby enable measurement of just the NEA gas that entered the venture input port. In the embodiments that use a turbine vacuum generator powered by NEA from an ASM, whether the oxygen sensor (gas sensor) is connected to the input or output port of the driven side of the turbine, a two-way valve selecting the input to the gas sensor can select flow from either the NEA flow or the ullage sample flow. Whether an on/off valve or a two-way valve is used according to different embodiments, either valve can be a solenoid-operated pneumatic valve, a pneumatically operated valve, or a pneumatic oscillator. Output flows from any of a venturi exhaust port, a venturi vacuum port, or a driven-side output from a turbine are all conveyed back into the ullage of the tank. The measurements of oxygen concentration of ullage gas are used to regulate the flow of purge gas (e.g. NEA) into the ullage. The measurements of oxygen concentration of purge gas (e.g. NEA) are used by the ASM to adjust its operating performance and efficiency.

An example method that the apparatus of the present invention may use to carry out its function may include the steps of a) measuring oxygen concentration in a flowing sample of ullage gas from a fuel tank using an oxygen sensor; b) determining whether the oxygen concentration of the flowing sample is above a desired level or not; c) directing a flow of purge gas into the ullage of the fuel tank if the measured oxygen concentration was higher than the desired level, or not directing the flow of purge gas into the ullage if the measured oxygen concentration was not higher than the desired level; and repeating these prior steps. One limitation may include using a diode laser absorption spectrophotometer as the oxygen sensor to make the measurements of oxygen concentration. Another limitation may be to interleave the measurements of oxygen concentration in ullage gas with measurements of oxygen concentration in the purge gas. Another limitation may be to use NEA from an ASM as the purge gas. Another limitation may be to use either a venturi or a pneumatically driven pump to draw the gas flow samples. Another limitation may be when using a venturi to obtain the flowing sample of purge gas by blocking the venturi output port to force purge gas out of the venturi vacuum port and through the oxygen sensor. Another limitation may to have a laser diode absorption spectrophotometer located close to or against the fuel tank. And another limitation may be to have the venturi or other pneumatically driven pump located close to or against the fuel tank.

OBJECTS AND ADVANTAGES OF THE INVENTIONS

Embodiments of the present invention do not require conveying sampled ullage gas to a location remote from the tank being sampled, or creating a hazard by exhausting the sampled gas to other than the ullage space itself. Furthermore, these embodiments do not require use of an oxygen sensor that requires operation at a dangerously high temperature (e.g. 700 degrees C.), or the use of electrically driven pumps or other devices that might cause an explosion when in the vicinity of hazardous gases. Also, since embodiments of the present invention can provide oxygen concentration measurements of both ullage gas and gas from an ASM from a single sensor, both the maintenance of tank safety and the operating performance of the ASM can be more intelligently controlled for better efficiency and lower carbon footprints.

Embodiments of the invention can use an oxygen sensor that is a tunable diode laser (tunable laser diode) optical absorption spectrometer, which can measure oxygen in the presence of fuel vapor safely and accurately, and which does not require heating to dangerous temperatures as does a zirconia type oxygen sensor. The fuel vapor does not have to be removed from the sample line, and the oxygen sensor and sampling pumps do not have to be located remote from the tank being sampled. Also, the oxygen concentration is measured correctly including the dilution caused by the fuel vapor.

NEA flow to be measured, and the ullage gas sample flow to be measured, both can be conditioned to an appropriate temperature range for measurement, and the temperature of the gas in the sensor can be measured conveniently to apply the temperature correction factors appropriate to the oxygen absorption line being measured.

Measurements of NEA or ullage gas by a diode-laser optical absorption spectrophotometer oxygen sensor provide indications of oxygen content. The oxygen absorption measured can be compared with the oxygen absorption of mixtures of oxygen with other gases determined by other means (calibration gases). Since the pressure of the NEA or the ullage gas in the sensor can also be measured accurately, the measurements by the oxygen sensor can be converted to units of partial pressure or concentration in the gas that is measured. However, the actual calculation of concentration of oxygen as a percentage, or partial pressure is not required during successful operation of the disclosed embodiments.

The various features and further advantages of the present inventions and their preferred embodiments will become apparent to ones skilled in the art upon examination of the accompanying drawings and the following detailed description. It is intended that any additional advantages be incorporated herein. The contents of the following description and of the drawings are set forth as examples only and should not be understood to represent limitations upon the scope of the present invention.

BRIEF DESCRIPTION OF THE SEVERAL VIEWS OF THE DRAWINGS

The foregoing objects and advantages of the present invention of coated widgets may be more readily understood by one skilled in the art with reference being had to the following detailed description of several embodiments thereof, taken in conjunction with the accompanying drawings. Within these drawings, callouts using like reference numerals refer to like elements in the several figures (also called views) where doing so won't add confusion. Within these drawings.

DETAILED DESCRIPTION OF THE INVENTION

The following is a detailed description of the invention and its preferred embodiments as illustrated in the drawings. While the invention will be described in connection with these drawings, there is no intent to limit it to the embodiment or embodiments disclosed. On the contrary, the intent is to cover all alternatives, modifications and equivalents included within the spirit and scope of the invention as defined by the appended claims.

Figure 1:
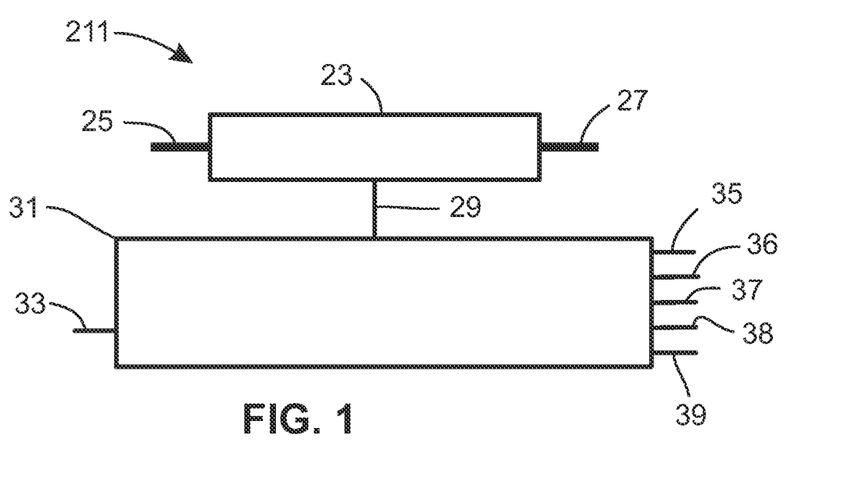
FIG. 1 shows a schematic representation of an oxygen sensor and a coupled controller.

FIG. 1 shows a schematic representation of a gas analyzer 211 as used in embodiments of the present invention and which comprises at least one oxygen sensor 23 coupled to a controller 31. The gas analyzer 211 may include additional oxygen sensors (not shown) each similar to the one oxygen sensor 23 that is shown and each in communication with the controller 31. The oxygen sensor 23 is in communication with the controller 31 as represented by the cable 29. The controller 31 has an electrical power input line 33 and electrical interconnectors such as 35-39 with which to communicate with, monitor, and control such external devices as other sensors, valves, air separation modules, and displays. The controller 31 may include its own display(s) which are not shown in the figure. The oxygen sensor has two gas ports 25 and 27 which are used as input and output ports for a flow of gas to be measure. Preferred embodiments of the invention use an oxygen sensor 23 that uses a tunable diode laser (tunable laser diode) optical absorption spectrometer (referred to herein simply as "diode laser spectrometer" or "diode laser oxygen sensor"). Example tunable diode laser optical absorption spectrometers have been disclosed in U.S. Pat. Nos. 5,047,639 by Wong; 5,448,071 and 5,491,341 by McCaul, Doggett and Thorson; 5,500,768 by Doggett and McCaul; 5,615,052 by Doggett; and 5,625,189 and 6,150,661 by McCaul and Doggett. European patent Number EU 0 729 565

B1 by McCaul, Doggett and Thorson also discloses tunable diode laser optical absorption spectrometers. Such diode laser spectrometers can measure oxygen in the presence of fuel vapor safely and accurately and do not require heating to dangerous temperatures as do zirconia type oxygen sensors. If they include a temperature sensor and numerical compensation for temperature variations, they can be operated with accuracy without requiring a heating element. The fuel vapor does not have to be removed from the sample line, and the oxygen sensor and sampling pumps do not have to be located remote from the tank being sampled. Also, the oxygen concentration can be measured correctly including the dilution caused by the fuel vapor or water vapor. NEA flow to be measured, and the ullage gas sample flow to be measured, both can be conditioned to within an appropriate temperature range for measurement, and the temperature of the gas in the oxygen sensor can be measured conveniently to apply the temperature correction factors appropriate to the oxygen absorption line being measured. The pressure of the NEA or the ullage gas within the oxygen sensor can be measured accurately, and the actual concentration or partial pressure of oxygen can be computed from the oxygen absorption measurement if display of those values is of interest to a human. Diode laser oxygen sensors very effectively measure oxygen concentrations in a flowing sample, do not require the oxygen sensor be at an unsafe temperature, and can measure flow in either direction through an optical cavity. Furthermore they can be made to operate safely near a fuel tank.

Figure 2:
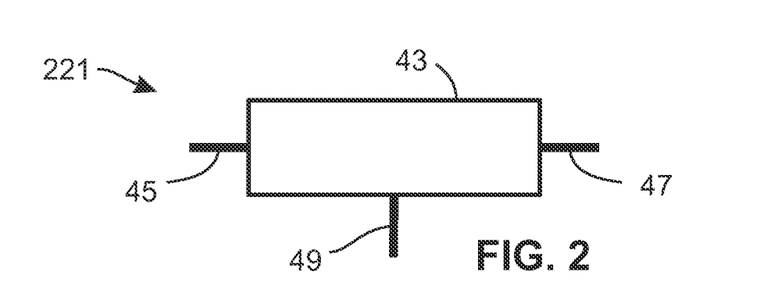
FIG. 2 shows a venturi pump.

FIG. 2 shows a venturi device 221 as used in some embodiments of the present invention as a pump (or flow directing device) to produce sample flows of gases to be measured. The venturi device is shown as a venturi housing 43 having an input port 45, an output port 47, and a vacuum port 49. A venturi device is one type of pump that is used in some of the embodiments of the present invention to deliver sample flows to the oxygen sensor 23 of the gas analyzer 211 shown in FIG. 1. The venturi device 221 operates differently on a flow from port 45 to port 47 then it does for a flow in the opposite direction from port 47 to port 45. Flows from the input port 45 to the output port 47 create a vacuum on the vacuum port 49 which can draw a sample flow into port 47 to mix with the flow out of the output port 47. If the output port 47 is shut off or otherwise blocked, flow flowing into the input port 45 will exit the vacuum port 49. This effect of a shut-off valve is used in some embodiments of the present invention to enable a gas analyzer 211 with its oxygen sensor 31 to measure oxygen concentration in the gas that flows into the input port as well as in the gas that flows into the vacuum port. Examples of such embodiments are disclosed in the FIGS. 4-11. Although not used for continuous measurements of flowing gas, not disclosing diode laser oxygen sensing, and not teaching sampling of gases close to their source, U.S. Pat. No. 6,427,543 by Torrison discloses venturi-based gas sampling for extracting and conveying gases for sampling by drawing a sample, turning the venturi off, and then measuring the sample. U.S. Pat. No. 6,189,516 by Hei discloses using a venturi restriction in the engine air-intake of an internal combustion engine as a motive force to draw fuel vapor from a fuel vapor extraction system into the engine's air-intake. According to Fox Valve of New Jersey which sells venturi devices, their Mini-venturi devices are also known as eductors, aspirators, vacuum-generators, mixing tees, and sampling jets). Fox claims that Mini-eductors have been used in every industry, from mixing fertilizer to purging fuel lines on the Space Shuttle. In their advertising, they show a venturi drawing a sample from an exhaust duct to be measured and returned to the exhaust duct.

Figure 3:
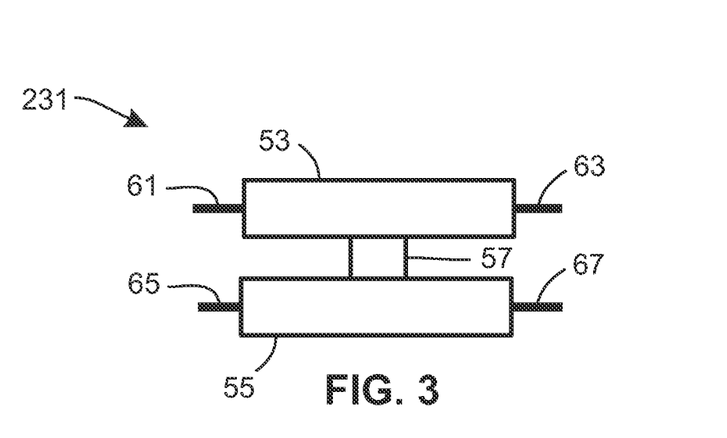
FIG. 3 shows a turbine pump comprising two turbines on a common spindle or axial.

FIG. 3 shows a pneumatically driven turbine pump 231 as used in some embodiments of the present invention and which comprises two turbine sides or portions 53 and 55 on a common spindle or axial 57, although other mechanical interconnecting means for interconnecting two them could be used instead. Flow streams within each of the portions 53 and 55 are separated from each other to prevent mixing one stream with another. A first turbine portion 53 is a power input portion 53 that drives a second turbine portion 55 that is the driven output portion 55. Thus one turbine portion 53 drives the other turbine portion 55. The power input portion 53 has a first input port 61 and a first output port 63. The driven output portion 55 has a second input port 65 and a second output port 67. In use, pressurized gas flowing into the first input port 61 causes the spindle 57 to rotate, and that flow then continues through the first turbine portion 53 until it exits the first output port 63. The turning of the spindle causes a vacuum within the second input port of the driven output portion 55 and produces a flow of gas drawn into the second input port 65 and out of the second output port 67. Thus the turbine pump 231 can be used as a pneumatically driven pump. A clutch may be incorporated into the spindle 57 (or its alternatives) and may be either electrically actuated or pneumatically actuated, although pneumatic actuation is the preferred choice used in the vicinity of combustible gases. Although described here as a pneumatically driven turbine pump 231, what is illustrated in FIG. 3 could also be any other equivalent pump, designed for rotation or not, that performs the same function of being pneumatically driven by a first flow stream to drive a second flow steam, and any of these could be used within an embodiment of the present invention in place of the described turbine pump 231.

Figure 4:
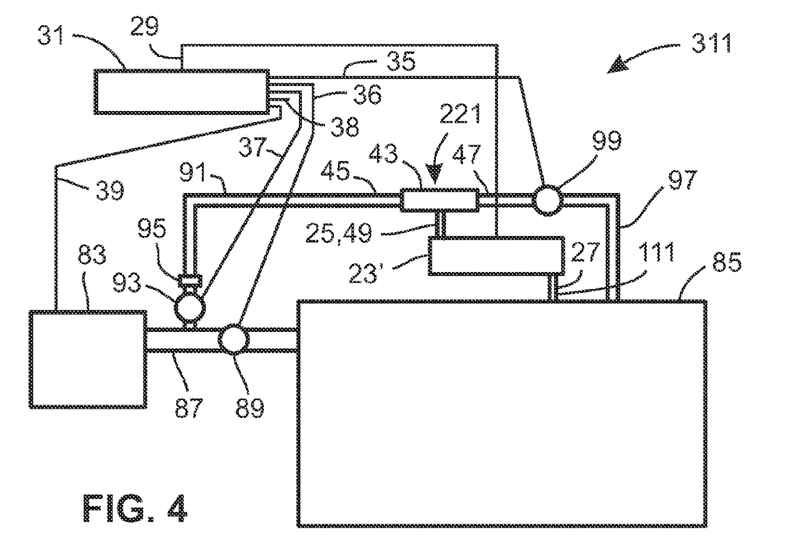
FIG. 4 shows a first embodiment of the invention as an ASM and fuel tank and configured with a venturi pump and with an oxygen sensor in communication with the vacuum port of the venturi pump.

FIG. 4 shows a first embodiment 311 of the invention as an ASM 83 and fuel tank 85 and configured with a venturi pump 221 and with an oxygen sensor 23' in communication with the vacuum port 49 of the venturi pump 221. The only difference between the oxygen sensor 23' and the oxygen sensor 23 shown in FIG. 1 is the location of the two ports 25 and 27. FIG. 1 shows those ports exiting opposite ends of the oxygen sensor, whereas FIG. 4 shows them exiting opposite sides of the oxygen sensor more for convenience in laying out the figure. The ASM is shown with its NEA output port connected to the tank by a conduit 87 which includes a first valve 89. Conduit 87 conveys nitrogen enhanced air (NEA) to the ullage (head space) within the tank. A conduit 91 is shown connecting the input port of the venturi 221 to the conduit 87 by way of a second valve and a flow device 95. Conduit 91 may alternatively be connected directly to the ASM NEA output rather than by way of conduit 87. The first and second valves 89, 93 may be considered part of the ASM 83. The vacuum port 49 of the venturi 221 is shown connected directly to the first sensor port 25 but this connection could also be by means of another interconnecting conduit not shown. The second sensor port 27 is shown connected to a conduit 111 that connects to the tank 85. The output port 47 of the venturi is connected by way of a conduit 97 and third valve 99 to the tank 85. The controller 31 of the gas analyzer 211 is shown in communication with the oxygen sensor 23' by way of cable 29, and to the ASM 83 by way of interconnector 39. The controller 31 is also shown in communication with the first, second, and third valves 89, 93, and 99 respectively by way of interconnectors 36, 37, and 35 respectively. (In the later figures, although not shown, the interconnector 35 would show being connected to valve 113 in FIGS. 6 and 7, to valve 125 in FIGS. 8 and 9, and to valve 135 in FIGS. 10 and 11. Also not shown in the later figures, the interconnector 38 would show being connected to the two-way valve 123 in FIGS. 8 through 11.) It should be readily understood by one skilled in the art that the example interconnections 35-39 between the controller 31 and the valves 89, 93, 99, 113, 125, and 135 may be alternatively substituted by interconnections between the ASM 83 and these valves more directly.

With the help of FIG. 4, it can be understood with this embodiment, that the venturi 221 can draw a continuous flow of ullage gas from the tank 85 to flow first though the oxygen sensor 23', then through the venturi vacuum port 49 and out the venturi output port 47 to flow back into the ullage of the tank 85. The motive power to create this flow of ullage gas is a flow of NEA pushed through the venturi input port 45 and on out of the venturi output port 47. While this configuration enables measurements of oxygen concentrations in a continuous flow of ullage sample, it can be interrupted to measure instead the oxygen concentration of the NEA itself by shutting the third valve 99 to force the NEA to exit the venturi vacuum port 49 to flow in through the oxygen sensor 23' in the reverse direction to that used when measuring the ullage flow sample. An example method of control by the controller 31 may begin with the first valve 89 in a closed state and both the second and third valves in an open state allowing a flow of NEA through conduits 91 and 97 and through the venturi 221 to cause a sample of ullage gas from the tank to flow through the gas analyzer 23' and back into the ullage in the tank. After measuring the oxygen concentration in the flowing ullage gas sample, the controller can measure the oxygen concentration of the NEA by shutting the third valve 99 to force NEA to flow out of the venturi vacuum port 49 and through the oxygen sensor 23'. After measuring oxygen concentration of both the ullage gas and the NEA being supplied by the ASM 83, if the controller finds that the oxygen concentration of the ullage is higher than a desirable level, it may again open the third valve to continue measurement of the ullage gas oxygen concentration while it opens the first valve 89 to allow purge gas from the ASM NEA to flow into the ullage until the oxygen concentration it measures in the ullage flow through the oxygen sensor 23' subsides to below the same or another desirable level before turning the first valve 89 off (or to a position that reduces the flow rate into the tank 85. This described sequence brings the system back to where the sequence began so that it can continue indefinitely or until shut down.

In FIG. 4, a flow device 95 is shown in conduit 91. This flow device 95 is shown to represent that any of the conduits used within the various embodiments illustrated may incorporate one or more additional flow devices for various purposes. Flow devices that may be useful for one or more purposes depending upon into which conduit they may be installed include but are not limited to the following: a flow restrictor, a filter, a trap, a shut-off valve, a flow control valve, a two-way or multi-way selector valve, a temperature sensor, a pressure sensor, a pressure ballast, an oscillator, a flame arrestor, a pump, a heater, a cooling device, a regulator, an actuator, and indicator, an expansion-accommodating conduit, another venturi, and/or a coupling. Conduits may be of metal, plastic, or other materials suitable for handling fuel and fuel vapors and withstanding the pressure variations and pressure variations of the environments in which they are to be used. Whereas some of the flow devices that flow device 95 may represent may be passive devices, those that are active and admit to being monitored or controlled may be connected to communicate with the controller 31 by way of additional interconnectors similar to the interconnectors 35-39.

Figure 5:
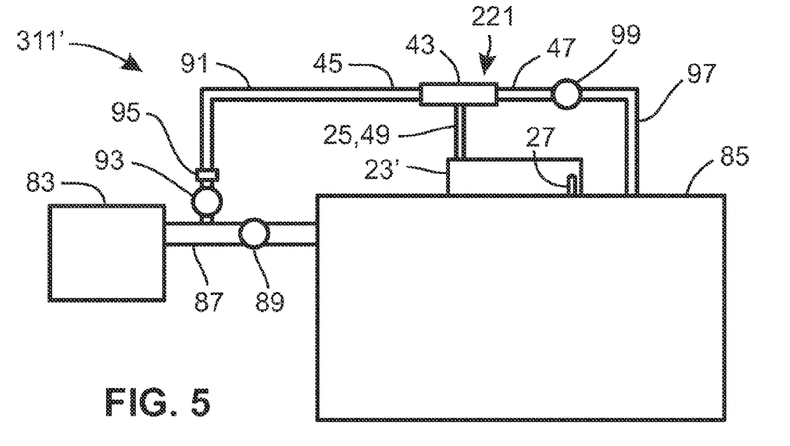
FIG. 5 shows a second embodiment of the invention as similar to that shown in FIG. 4 but with the oxygen sensor against the tank.

FIG. 5 shows a second embodiment 311' of the invention as similar to that shown in FIG. 4 but with the oxygen sensor 23' positioned against the tank 85 or at least near or very close to it. This is to illustrate that the oxygen sensor 23' does not have to be located remote from the tank 85, and that the venturi 221 does not have to be remote from the tank 85 either and can also be at least near or very close to it. Not shown between the oxygen sensor 23' and the tank 85 is optionally an insulator to improve thermal stability of the oxygen sensor 23'. It will be obvious to those skilled in the art that reducing or eliminating the length of conduit lines such as conduit 111 between the oxygen sensor and the tank will not only improve oxygen sensor accuracy but also reduce response times to obtain meaningful information about the tank that is being monitored with the oxygen sensor measurements. Also not shown, to keep the drawing less cluttered, are the controller 31, its cable 29 to the oxygen sensor 23', and the interconnectors 35-39, although it is intended that they be connected and used in this second embodiment 311' as they were in the embodiment 311. It is intended within this disclosure that the controller 31, its cable 29 to the oxygen sensor 23', and the interconnectors 35-39, as well as interconnectors of the controller 31 to additional valves and other devices, although not shown, are all a part of each of the embodiments illustrated in FIGS. 4-11.

Figure 6:
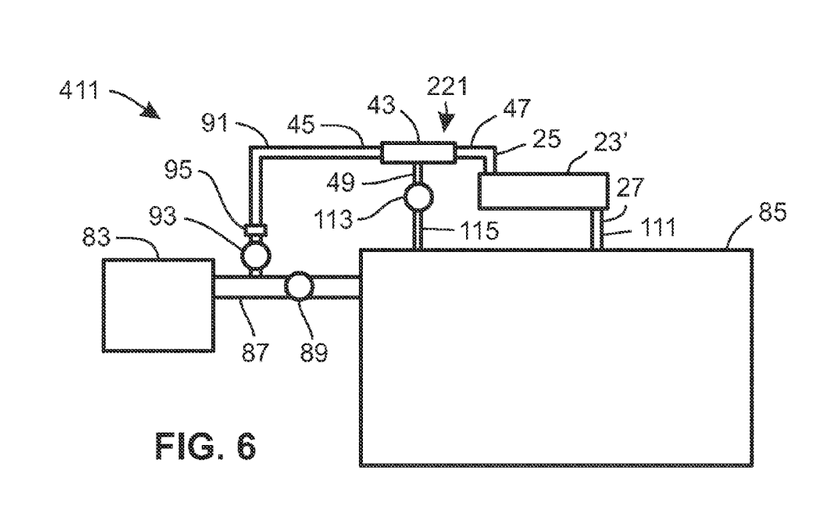
FIG. 6 shows a third embodiment of the invention as an ASM and fuel tank and configured with a venturi pump, and with an oxygen sensor in communication with the exhaust port of the venturi.

FIG. 6 shows a third embodiment 411 of the invention as an ASM 83 and fuel tank 85 and configured with a venturi pump 221, and with an oxygen sensor 23' in communication with the exhaust port 47 of the venturi. As before, the ASM 83 has a conduit 87 connecting NEA by way of a first valve 89 to the tank 85. A conduit 91 includes a second valve 93 and another flow device 95 and connects the NEA of the ASM 83 to the input port 45 of the venturi 221. The vacuum port 49 of the venturi 221 is connected to the tank 85 by way of a conduit 115 and a fourth valve 113. The output port 47 of the venturi 221 is connected to a first port 25 of the oxygen sensor 23', where a conduit not shown may be used to connect these two ports 47 and 25. The second port 27 of the oxygen sensor 23' is connected by way of a conduit 111 to the tank 85. In this embodiment 411, the second valve 93 is open when the oxygen sensor 23' takes measurements. The fourth valve 113 is opened when the oxygen sensor 23' is to take measurements from sample flow of ullage gas mixed with the NEA from conduit 91, but the fourth valve 113 is closed when it is to take measurements of the NEA flow alone from conduit 91. The first valve 89 would be opened more or less depending upon whether the oxygen concentration of the ullage gas is determined by the controller 31 (not shown) to be above or below a desired level respectively. The fourth valve 113 can be alternated between opened and closed to permit oxygen measurements by the oxygen sensor 23' to alternate respectively between measurements of a mixture of ullage gas and NEA or measurements of the NEA alone.

Figure 7:
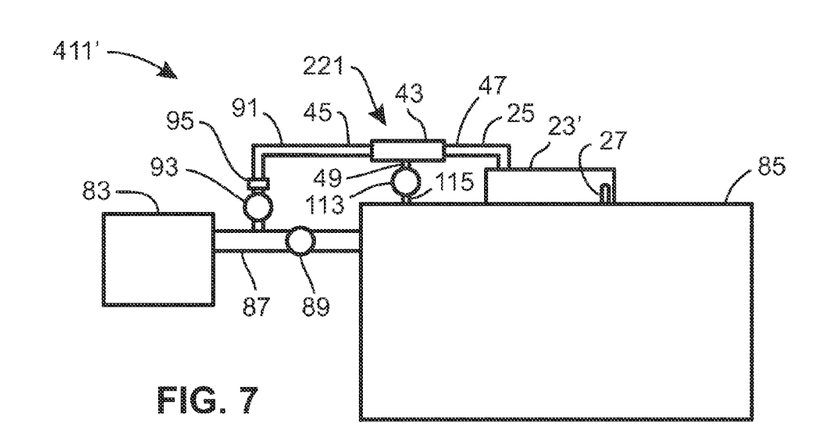
FIG. 7 shows a fourth embodiment of the invention as similar to that shown in FIG. 6 but with the oxygen sensor against the tank.

FIG. 7 shows a fourth embodiment 411' of the invention as similar to that shown in FIG. 6 but with the oxygen sensor 23' positioned against the tank 85 or at least near or very close to it. This is to illustrate that the oxygen sensor 23' does not have to be located remote from the tank 85, and that the venturi 221 does not have to be remote from the tank 85 either and can also be at least near or very close to it. Not shown between the oxygen sensor 23' and the tank 85 is optionally an insulator to improve thermal stability of the oxygen sensor 23'.

Figure 8:
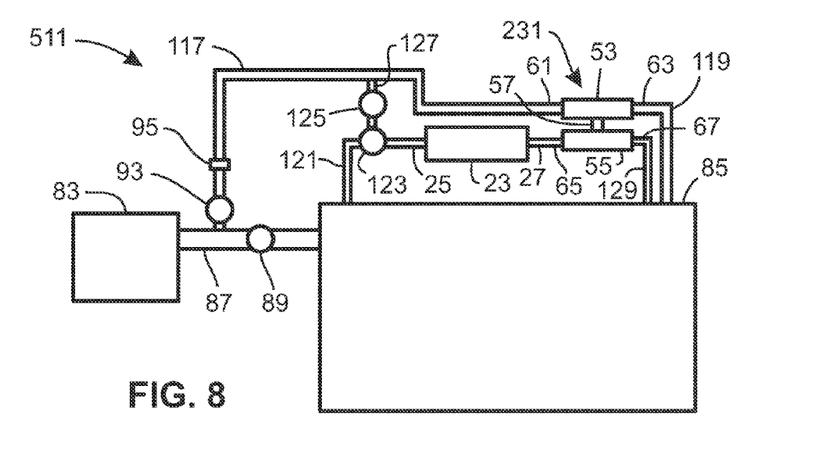
FIG. 8 shows a fifth embodiment of the invention as an ASM and fuel tank and configured with a turbine pump, and with an oxygen sensor in communication with the vacuum port of the output side of the turbine, and with the input of the oxygen sensor in selectable communication with the tank and an NEA output port of the ASM.

FIG. 8 shows a fifth embodiment 511 of the invention as an ASM 83 and fuel tank 85 and configured with a turbine pump 231, and with an oxygen sensor 23 in communication with the second input (vacuum) port 65 of the output side 55 of the turbine 231, and with the oxygen sensor 23 in selectable communication with the tank 85 and an NEA output conduit 87 of the ASM 85. As before, the ASM 83 has a conduit 87 connecting NEA by way of a first valve 89 to the tank 85. A conduit 117 includes a second valve 93 and another flow device 95 and connects the NEA of the ASM 83 to the first input port 61 of the turbine pump 231. The first output port 63 of the turbine 231 is connected to the tank 85 by way of conduit 119. The second output port 67 of the turbine 231 is connected to the tank 85 by conduit 129. The second port 27 of the oxygen sensor 23 is connected to the second input port 65 of the turbine 231 directly or by way of a conduit not shown. A conduit 121 connects the tank 85 to the first port 25 of the oxygen sensor 23 by way of a two-way valve 123. Conduit 127 connects the two-way valve 123, by way of fifth valve 125, to the conduit 117. In this embodiment 511, the first valve 89 is made to open or shut more or less as purge gas (NEA) is required for the tank ullage. The second valve 93 is opened when oxygen measurements are to be made. When the oxygen sensor 23 is to measure the oxygen concentration of the ullage gas, the fifth valve 125 is shut and the two-way valve 123 selects flow from the ullage along conduit 121 to be conveyed to the first port 25 of the oxygen sensor 23. When the oxygen sensor 23 is to measure the oxygen concentration of the NEA gas, the fifth valve 125 is opened and the two-way valve 123 selects flow from the fifth valve 125 along conduit 127. In operation, oxygen measurements are made alternately of both the ullage sample flow and the NEA sample flow, and the controller 31 (not shown) causes the first valve 89 to open more or less depending upon whether the oxygen concentration in the ullage is determined to be higher or lower respectively than a desired maximum level.

Figure 9:
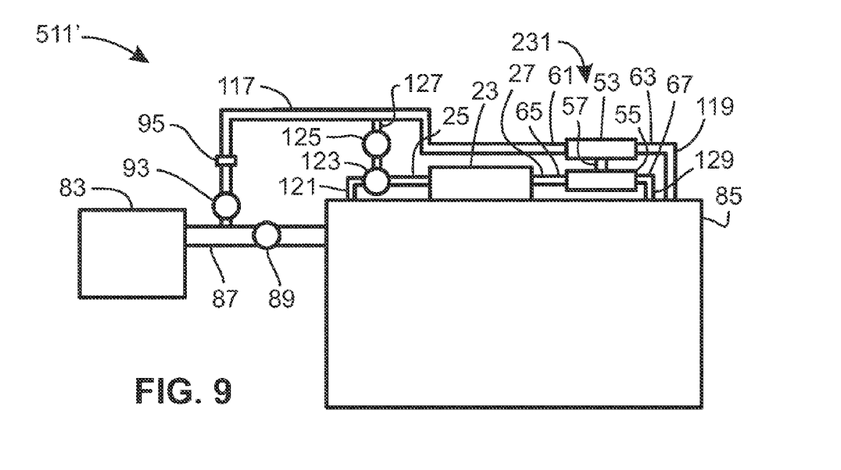
FIG. 9 shows a sixth embodiment of the invention as similar to that shown in FIG. 8 but with the oxygen sensor against the tank.

FIG. 9 shows a sixth embodiment 511' of the invention as similar to that shown in FIG. 8 but with the oxygen sensor 23 positioned against the tank 85 or at least near or very close to it. This is to illustrate that the oxygen sensor 23' does not have to be located remote from the tank 85, and that the turbine 231 does not have to be remote from the tank 85 either and can also be at least near or very close to it. Not shown between the oxygen sensor 23' and the tank 85 is optionally an insulator to improve thermal stability of the oxygen sensor 23'.

Figure 10:
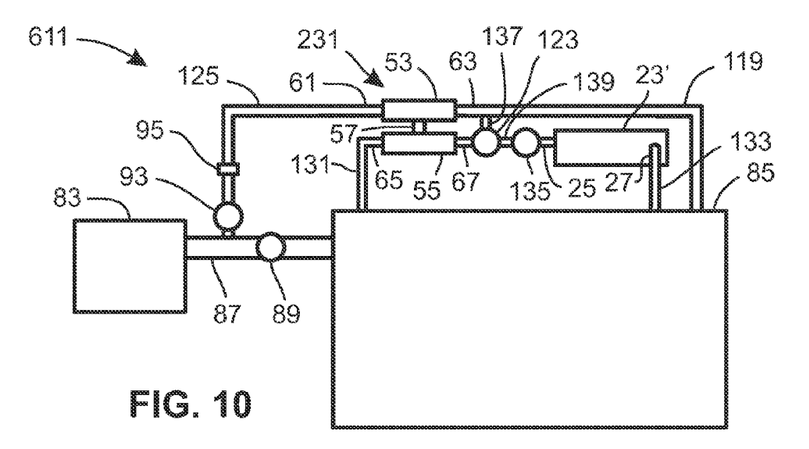
FIG. 10 shows a seventh embodiment of the invention as an ASM and fuel tank configured and with a turbine pump, and with an oxygen sensor in selectable communication with the exhaust port of the output side of the turbine and with the exhaust port of the input side of the turbine.

FIG. 10 shows a seventh embodiment 611 of the invention as an ASM 83 and fuel tank 85 and configured with a turbine pump 231, and with an oxygen sensor 23' in selectable communication with the second output port 67 of the output side 55 of the turbine 231 and with the first output port 63 of the input side 53 of the turbine 231. As before, the ASM 83 has a conduit 87 connecting NEA by way of a first valve 89 to the tank 85. A conduit 125 includes a second valve 93 and another flow device 95 and connects the NEA of the ASM 83 to the first input port 61 of the turbine pump 231. The first output port 63 of the turbine 231 is connected to the tank 85 by way of conduit 119. The second port 27 of the oxygen sensor 23' is connected to the tank 85 by way of a conduit 133. The second input port 65 of the turbine 231 is connected to the tank 85 by way of a conduit 131. The first port 25 of the oxygen sensor 23' is connected by way of a conduit 139 and a sixth valve 135 to a two-way valve 123. The two-wave valve is additionally connected to both the second output port 67 of the turbine 231 and by way of a conduit 137 to the conduit 119. In this embodiment 611, the first valve 89 is made to open or shut more or less as purge gas (NEA) is required for the tank ullage. The second valve 93 is opened when oxygen measurements are to be made. When the oxygen sensor 23' is to measure the oxygen concentration of the ullage gas, the sixth valve 135 is open and the two-way valve 123 selects flow from the ullage along conduit 131 to be conveyed to the first port 25 of the oxygen sensor 23' by way of the power output portion 55 of the turbine 231, and both the two-way valve 123 and the opened valve 135. When the oxygen sensor 23' is to measure the oxygen concentration of the NEA gas, the sixth valve 135 is opened and the two-way valve 123 selects flow from the conduit 137. If oxygen measurements are not being made, the sixth valve 135 and the second valve 93 are both turned off. In operation, oxygen measurements are made alternately of both the ullage sample flow and the NEA sample flow, and the controller 31 (not shown) causes the first valve 89 to open more or less depending upon whether the oxygen concentration in the ullage is determined to be higher or lower respectively than a desired maximum level.

Figure 11:
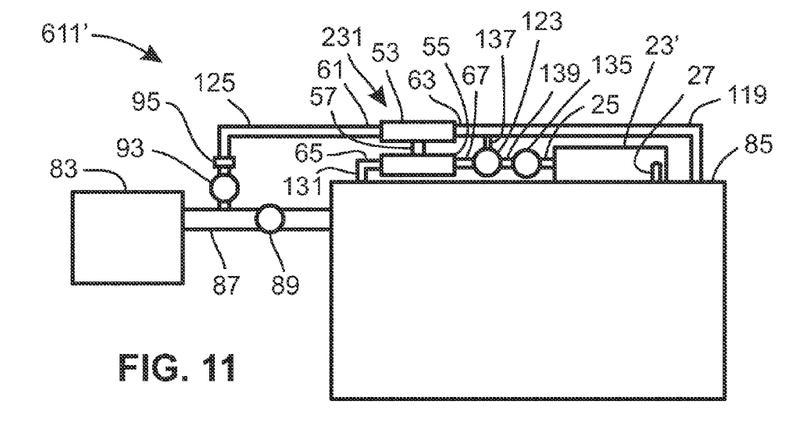
FIG. 11 shows an eighth embodiment of the invention as similar to that shown in FIG. 10 but with the oxygen sensor against the tank.

FIG. 11 shows an eighth embodiment 611' of the invention as similar to that shown in FIG. 10 but with the oxygen sensor 23' against the tank or very close to it. This is to illustrate that the oxygen sensor 23' does not have to be located remote from the tank 85, and that the turbine 231 does not have to be remote from the tank 85 either and can also be at least near or very close to it. Not shown between the oxygen sensor 23' and the tank 85 is optionally an insulator to improve thermal stability of the oxygen sensor 23'.

Embodiments of the invention further include sampling multiple locations within ullage as for example on an airplane where the fuel on board may be distributed among many interconnected tanks, or where an individual tank may be spread out to use available space having a complicated shape. Measuring the resulting multiple sample streams may be accommodated by employing multiple oxygen sensors, and each of the oxygen sensors may be plumbed to sequence through multiple sample streams. The multiple oxygen sensors may be each in communication with a respective controller, or all or a subset of the oxygen sensors may communicate to a single controller. Where multiple controllers are to be used, they may each communicate with a super controller that controls them all.

Embodiments of the invention further include methods to control the concentration of oxygen within the ullage of a tank containing volatile liquid, such as a fuel tank. One such method comprises steps of: a) using a pump powered by compressed gas to convey a sample flow of ullage gas drawn from the tank through an oxygen sensor; b) using measurements taken by the oxygen sensor of the sample flow to determine whether the oxygen concentration is high enough to present a hazard; and c) controlling the flow of purge gas into the tank based on the oxygen measurements. A further limitation to these steps may include the pump being a venturi pump or a turbine pump. Another step may be the blocking of the output port of the venturi pump to cause the sample flow that is measured by the oxygen sensor to be a flow of gas exiting the vacuum port to the venturi. A further limitation to these steps may be including the pump being a turbine for handling two separate gas streams, one gas stream for powering the pump and the other for motivating and conveying flowing gas samples alternately for measurement by the oxygen sensor. And another limitation may be having the pump and/or the oxygen sensor located adjacent to the tank or even against it (i.e. not remote from the tank).

Several embodiments are specifically illustrated and/or described herein. However, it will be appreciated that modifications and variations are covered by the above teachings and within the scope of the appended claims without departing from the spirit and intended scope thereof. Method steps described herein may be performed in alternative orders. The examples provided herein are exemplary and are not meant to be exclusive.

Although specific embodiments of the invention have been illustrated and described herein, those of ordinary skill in the art will appreciate that any arrangement configured to achieve the same purpose may be substituted for the specific embodiments shown. This disclosure is intended to cover any and all adaptations or variations of various embodiments of the invention. It is to be understood that the above description has been made in an illustrative fashion, and not a restrictive one. Combinations of the above embodiments, and other embodiments not specifically described herein will be apparent to those of skill in the art upon reviewing the above description. The scope of various embodiments of the invention includes any other applications in which the above structures and methods are used. The entire disclosures of all references, applications, patents, and publications cited above are hereby incorporated by reference.

We claim:

1. A gas measuring apparatus for measuring concentrations of oxygen in a flowing sample of a vapor-gas mixture drawn from a tank that is filled partially with liquid and partially with the vapor-gas mixture, wherein a flow from a source of purging gas can be conveyed into the tank; the gas measuring apparatus comprising:
    a. an oxygen sensor having two ports through which the sample flows, wherein one of the two ports is plumbed to the tank; and
    b. a pump having at least three ports plumbed respectively to the other of the two ports of the oxygen sensor, to the source of purging gas, and to the tank;
    wherein the pump can convey the flowing sample through the oxygen sensor and back to the tank; and
    wherein the pump is powered by a flow of pumping gas.

2. The gas measuring apparatus of claim 1; wherein the oxygen sensor is part of a diode-laser optical absorption spectrophotometer and is located next to the tank.

3. The gas measuring apparatus of claim 2;
    wherein the oxygen sensor is in communication with a spectrophotometer controller of the spectrophotometer; and
    wherein the spectrophotometer controller is in communication with the source of the purging gas to regulate flow from the source of purging gas to the tank.

4. The gas measuring apparatus of claim 1; wherein the pumping gas is the purging gas.

5. The gas measuring apparatus of claim 4; wherein the pump is a venturi device having an input port, an output port, and a venturi port.

6. The gas measuring apparatus of claim 5; wherein the venturi device draws the vapor-gas mixture into the venturi port.

7. The gas measuring apparatus of claim 6; wherein the venturi device draws the vapor-gas mixture through the oxygen sensor.

8. The gas measuring apparatus of claim 7; further comprising a blocking valve connected to the output port;
    wherein when the output port is not blocked, the flow of the vapor-gas mixture flows from the tank, through the oxygen sensor where it can be measured, into the venturi where it mixes with purging gas, and out through the output port to the tank; and
    wherein when the output port is blocked, purging gas flows out of the venturi port, through the oxygen sensor where it can be measured, and into the tank, thus also flushing any liquid that may have accumulated in the oxygen sensor back to the tank.

9. The gas measuring apparatus of claim 1; wherein the pumping gas is one of the group consisting of the purging gas or pressurized air.

10. The gas measuring apparatus of claim 9; wherein the pump comprises two rotary elements on a common axial; wherein the two rotary elements convey flows separately from one another.

11. The gas measuring apparatus of claim 10; wherein the pump is a turbine device.

12. A purging system comprising:
    a. a pressurized supply of purging gas plumbed to a fuel tank by way of a first valve;
    b. a sampling pump with a first pump port plumbed to the supply of purging gas, and with a third pump port plumbed to the fuel tank to carry at least one of the group consisting of the purging gas and a mixture of at least the purging gas and fuel vapor back into the tank;
    c. an oxygen sensor with a first sensor port plumbed to a second pump port of the sampling pump, and with a second sensor port plumbed to the tank; and
    d. a controller for operating the oxygen sensor and controlling the first valve.

13. The purging system of claim 12; wherein a second valve is plumbed to control the flow of purging gas to the sampling pump.

14. The purging system of claim 12; wherein the sampling pump is a venturi device.

15. The purging system of claim 14; wherein the sampling pump is fluidly connected to a third valve that when closed causes only purging gas to flow through the oxygen sensor.

16. The purging system of claim 15;
    wherein the oxygen sensor is a diode-laser optical absorption spectrophotometer; and
    wherein the oxygen sensor and sampling pump are located close to the tank.

17. A method of controlling amounts of oxygen in the ullage of a fuel tank, the method comprising the steps of:
    a. using a pumping gas to create a sample flow from the ullage;
    b. sensing oxygen concentration in the sample flow and returning the sample flow back to the fuel tank; and
    c. adding purge gas to the fuel tank if the oxygen concentration sensed is higher than a safe amount.

18. The method of claim 17; wherein the oxygen sensor is part of a diode-laser absorption spectrophotometer, and wherein the oxygen sensor is located next to the tank.

19. The method of claim 17; wherein the pumping gas powers a venturi device to create the sample flow.

20. The method of claim 17 further comprising the steps of:
    a. using the pumping gas to create a sample flow of pumping gas;
    b. sensing oxygen concentration in the sample flow of pumping gas and conveying that flow to the fuel tank, wherein the same oxygen sensor is used as used to sense oxygen in the sample flow from the ullage; and
    c. using the measurement of oxygen concentration in the sample flow of pumping gas in making adjustments to the performance of the source of the purging gas;
    wherein the pumping gas is nitrogen enhanced air and the source of the purging gas is an air separation module.

21. The method of claim 17; wherein the pumping gas is one of the group consisting of air or the purging gas.

22. The method of claim 21; wherein the pumping gas powers a dual chambered turbine or other pneumatically driven pump that maintains a driving flow and a driven flow separate from one another.

* * * * *